Dec. 10, 1929. A. E. LAKE 1,739,364
TRANSPORT DEVICE FOR DAMAGED VEHICLES
Filed Sept. 8, 1926 2 Sheets-Sheet 2
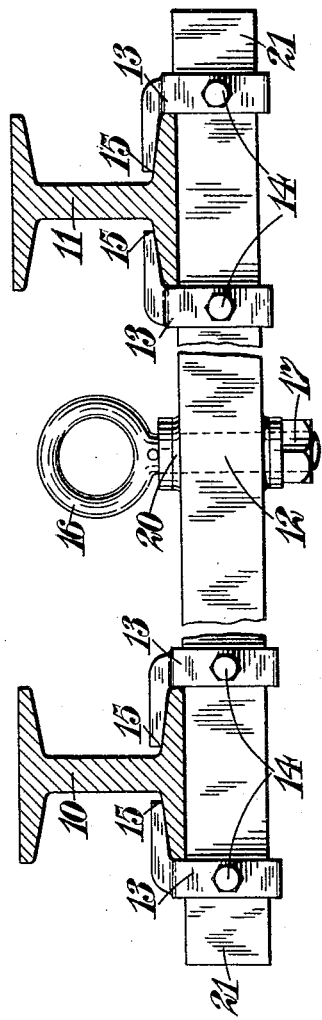
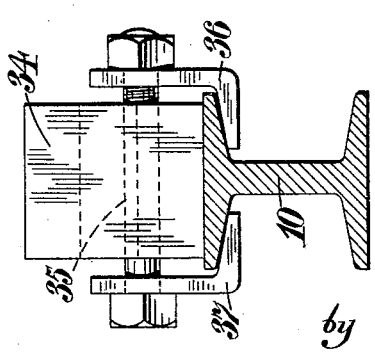
Inventor
Arthur E. Lake
by Wilkinson & Fiusta
Attorneys.

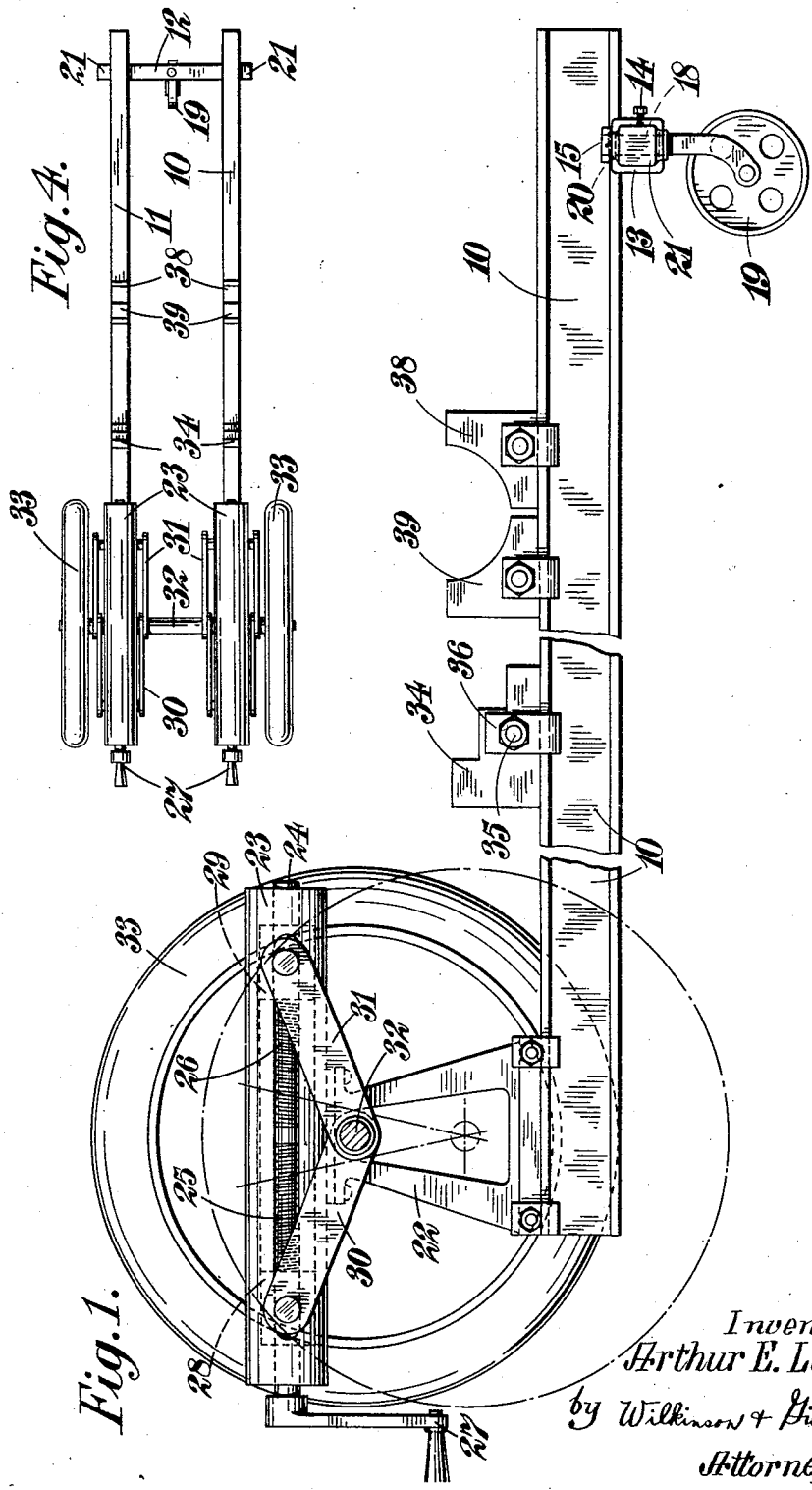

Patented Dec. 10, 1929

1,739,364

UNITED STATES PATENT OFFICE

ARTHUR ERNEST LAKE, OF BISHOP'S STORTFORD, ENGLAND

TRANSPORT DEVICE FOR DAMAGED VEHICLES

Application filed September 8, 1926, Serial No. 134,237, and in Great Britain October 28, 1925.

This invention has for its object to provide an improved device for facilitating the transport of damaged vehicles and like objects which by reason of their size or shape or construction are not easily capable of transport without a considerable amount of equipment, such, for example, as large cranes. The invention is particularly applicable for use in the salvage of motor vehicles which have suffered damage to such an extent that they cannot be transported on their own wheels, and this particular application of it will be hereinafter described by way of example.

According to the present invention there is provided a demountable carrier for the purpose described, comprising two or more longitudinal members, tie-bars adapted to be detachably secured to them at or near their ends, said tie-bars being preferably adjustable as to their length, means for securing wheels at one end of the longitudinal members for the purpose of transport and means for lifting and supporting the other ends, such for example as on a portable crane.

The particular feature of this invention is that it provides a demountable frame, or in other words, a frame of which the longitudinal members can be detached from the other members so that it is possible to insert the said longitudinal members under or through the article to be lifted and thereafter to brace them together by the tie-bars at or near their ends, and to mount wheels upon the frame thus constituted, upon which the device may be transported.

According to another feature of this invention, the tie-bar aforesaid at one end may constitute or be associated with an axle for a pair of wheels, and the tie-bar at the other end is adapted, for example suitably shaped, to be lifted by and connected to a towing vehicle.

According to another feature of this invention, there is provided the combination with the longitudinal frame-members aforesaid, of devices such as stops or crutches which are adapted to engage suitable parts of the object being lifted to retain it in position. In the case of salvaging a motor vehicle, these devices may take the form of crutches which will engage the axles of the vehicle.

According to yet another feature of this invention, the demountable carrier may be provided with a single wheel at the other end of the frame from the two wheels aforesaid, such wheel being arranged to permit steering movements of the carrier. Obviously, of course, a pair of such steering wheels can be used, but it is desirable to maintain simplicity in the construction of the device.

According to yet another feature of this invention, the main carrying-wheels which are mounted on the frame as aforesaid, may have incorporated or associated with them a lifting device, whereby the wheels can be attached to the frame whilst the object to be lifted is still on the ground, and the operation of this device adjusts the wheels relatively to the frame so that the object is lifted clear of the ground ready for transport.

In the accompanying drawings, which diagrammatically illustrate by way of example a simple embodiment of the present invention—

Figure 1 is a side elevation showing one of the longitudinal members and the parts associated with it, viewing it from a point between the two frame-members when assembled;

Figures 2 and 3 are views showing details and modifications in the construction; and Figure 4 is a plan view of the assembled carrier on a reduced scale.

Like reference characters indicate like parts throughout the drawings.

Referring to these figures, the device comprises two longitudinal frame-members 10, 11 which may take the form of I-section girders or other beams of suitable strength, and these are adapted to be secured together at or near one end by a tie-bar 12. In the construction illustrated in Figure 3 this tie-bar 12 is provided with adjustable clips 13 which are adapted to be locked in place by set-screws 14 and are each provided with a lip 15 whereby it can grip a longitudinal frame-member. When these are constituted by I-section girders as shown, the tie-bar 12 can be placed underneath them and rigidly secured to them by means of two pairs of clips 13 arranged in the manner shown. It will be appreciated that it is not essential for this tie-bar 12 to be placed under the longitudinal members, for it could equally well be clipped to them when resting on them.

At the middle of the length of this tie-bar 12, a boss 20 is provided, having a hole drilled vertically through it, and this hole receives an eye-bolt 16 (see Figure 3) which is secured by a nut 17, or alternatively, it could receive a vertical spindle 18, as shown in Figure 1, this spindle carrying at its lower end a wheel 19 by which the frame can be wheeled along the road. The spindle 18 is preferably round and is cranked at its lower end so that the wheel 19 has a castor-action to permit of steering movements of the frame when supported in this manner, as illustrated in Figure 4.

The eye-bolt 16 provides a means for lifting that end of the carrier if a crane is available, but if the crane is not available, the wheel 19 may be inserted after jacking up the tie-bar to the requisite height. Instead of using a single wheel at the middle of the length of this tie-bar, as an alternative, the ends 21 of the tie-bar may be so formed as to permit wheels to be mounted on them if so desired.

The other ends of the longitudinal members 10, 11 are arranged to have secured on them brackets 22 each of which carries a casing 23 for a spindle 24 provided with right- and left-handed screw-threads, as shown at 25, 26. Any suitable means, such as the handle 27 is provided for turning this spindle, and the two nut-members 28, 29 engage the two threads respectively and carry links 30, 31. These links are both secured to a shaft 32 and constitute a toggle linkage whereby the shaft 32 may be moved in a direction at right-angles to the length of the spindle 24, that is to say, vertically, and the shaft 32 carries at its two ends the road wheels whereof one is indicated at 33. The mechanism is preferably so designed that the range of adjustment of the height of the wheels 33 enables them to be secured in place with the longitudinal frame-members all lying on the ground. It will be seen that the toggle mechanism constitutes an effective jack whereby any load on the frame-members 10 can easily be lifted.

In order to secure the load upon the longitudinal frame-members 10, 11, stops or blocks may be provided, such as is illustrated at 34 in Figure 1. Any desired number of these can be provided, and they are so arranged that they can be clamped on to the frame-member 10 at any convenient position, for example by the construction shown in Figure 2. The block 34 may be, for example, a hardened block, of the shape shown, and a hole is drilled through it to receive a bolt 35 whereby two L-shaped clamping members 36, 37 can be secured on it to grip a flange of the frame-member 10. Obviously, however, various other devices may be used for securing these blocks.

Instead of the stepped formation of block shown at 34, they may be given a crutch formation, suitable, for example, for engaging the axle of a motor-vehicle, or they may be made in pairs, as shown at 38, 39 so that the two together constitute a crutch-like member.

In using this device, the parts would conveniently be carried to the damaged vehicle in a demounted state, on the salvage wagon. The two longitudinal beams would then be inserted underneath the damaged vehicle, this being a simple operation, because each beam is dealt with singly and is a uniform straight member of cross-sectional dimensions suited to the work it has to do. The stops or other locking devices are adjusted so as to grip the damaged vehicle, and it is secured in any other desired manner to the frame-members. The frame-members are then tied together by the tie-bar 12 and the rear wheels 33 are mounted upon them and any other tie-bars that may be thought necessary may be provided to brace the two frame-members. The whole is then ready for lifting, the rear end being lifted by the mechanism illustrated in Figure 1, and the other end lifted by a crane, which may also be used for towing the damaged vehicle; the front end may alternatively be lifted in some other way, and the wheel 19 mounted on it so that the whole is ready for towing.

It will be appreciated that the particular construction hereinbefore described is an extremely simple and practical embodiment of the invention, and that many modifications may be made within the scope of the appended claims. Thus for example each of the rear wheels may be mounted independently on one of the longitudinal frame-members, and any other mechanism than the toggle mechanism which will provide the desired displacement of the wheel relatively to the frame-member may be used. Thus, for example, the wheel, or the pair of wheels, may be mounted on arms pivoted on a bracket secured to the longitudinal frame-member, and means, such as a worm and worm-wheel or a nut-and-screw or other similar device giving a mechanical advantage, may be operative on the lever for the purpose of moving the wheel. Also, in some instances it may not be necessary to detach the rear-wheels, or the front tie-bar, when inserting the two longitudinal members under the object to be lifted, and it may be possible in some instances to use a U-shaped frame-member instead of two separate longitudinal frame-members.

I claim:—

1. For use in salvaging damaged vehicles and like objects, a demountable carrier comprising in combination two longitudinal members, two supports mounted on the same at one end thereof, two toggle lifting mechanisms, one carried by each of said supports, a wheel axle carried by said lifting mechanisms, and two wheels mounted on said axle, one at each end thereof, a tie-bar adjustably and detachably mounted on the other end of said longitudinal members, a single wheel mounted on said tie-bar between said longitudinal members and arranged to permit of steering movements, devices carried by the longitudinals between their ends adapted to engage parts other than the axles of a disabled vehicle supported on the carrier, and crutches carried by the longitudinals between their ends, which crutches are adapted to engage the axles of a disabled vehicle supported on the carrier.

2. For use in salvaging damaged vehicles and like objects, a demountable carrier comprising in combination a plurality of longitudinal members adapted to be placed independently one of another under the object to be salvaged, one or more tie-bars adapted to be detachably secured to the longitudinal members at or near their ends while they are under the object and so as to permit adjustment of the transverse distance between said longitudinal members, means for securing a wheel for transport purposes at one end of said longitudinal members, and means for lifting and supporting the other end of the latter.

3. For use in salvaging damaged vehicles and like objects, a demountable carrier comprising in combination a plurality of longitudinal members adapted to be placed independently one of another under the object to be salvaged, a tie-bar having means whereby it may be detachably secured to the longitudinal members while under the vehicle, means on the tie-bar for supporting one end of the carrier, an axle, means whereby said axle may be detachably and adjustably connected with said longitudinal members, and a wheel carried by said axle.

4. For use in salvaging damaged vehicles and like objects, a demountable carrier comprising in combination a plurality of longitudinal flanged members adapted to be placed independently of one another under the object to be salvaged, a tie-bar also adapted to be placed independently of the members beneath such members, clips carried adjustably on said tie-bar for clamping upon the flanges of said members whereby to hold the members in desired spaced relation, brackets adjustably and detachably coupled to said flanged members, a vertically shiftable axle associated with said brackets, wheels carried by said axle, and means on the brackets for adjusting said axle and wheel up and down whereby to raise and lower said members.

In testimony whereof I affix my signature.

ARTHUR ERNEST LAKE.